US012695592B2

(12) United States Patent
Choi et al.

(10) Patent No.: US 12,695,592 B2
(45) Date of Patent: Jul. 28, 2026

(54) ELECTRONIC DEVICE FOR ESTIMATING APPROXIMATE RANK OF HOMOMORPHIC CIPHERTEXT AND CONTROL METHOD THEREOF

(71) Applicant: CRYPTO LAB INC., Seoul (KR)

(72) Inventors: Hosik Choi, Yongin-si (KR); Minje Park, Seoul (KR); Jaeseon Kim, Seoul (KR); Sungchul Shin, Seoul (KR); Sulgi Kim, Seoul (KR)

(73) Assignee: CRYPTO LAB INC., Seoul (KR)

( * ) Notice: Subject to any disclaimer, the term of this patent is extended or adjusted under 35 U.S.C. 154(b) by 0 days.

(21) Appl. No.: 18/818,838

(22) Filed: Aug. 29, 2024

(65) Prior Publication Data

US 2025/0080319 A1     Mar. 6, 2025

(30) Foreign Application Priority Data

| Aug. 29, 2023 | (KR) | .......................... | 10-2023-0113667 |
| Oct. 19, 2023 | (KR) | .......................... | 10-2023-0140678 |
| Feb. 1, 2024 | (KR) | .......................... | 10-2024-0015982 |
| Aug. 8, 2024 | (KR) | .......................... | 10-2024-0106378 |

(51) Int. Cl.
*H04L 29/06* (2006.01)
*H04L 9/00* (2022.01)

(52) U.S. Cl.
CPC .................................... *H04L 9/008* (2013.01)

(58) Field of Classification Search
CPC ........................................................ H04L 29/06
See application file for complete search history.

(56) References Cited

U.S. PATENT DOCUMENTS

| 2023/0081162 A1* | 3/2023 | Lee ...................... G06F 18/2415 380/28 |
| 2023/0237127 A1* | 7/2023 | Joshi .................... G06F 18/2113 706/12 |
| 2024/0413966 A1* | 12/2024 | Soceanu ................. H04L 9/008 |
| 2025/0175322 A1* | 5/2025 | Bourgerie ................ H04L 9/40 |

* cited by examiner

*Primary Examiner* — Jason K Gee
(74) *Attorney, Agent, or Firm* — Steinfl + Bruno LLP

(57) ABSTRACT

Provided are an electronic device for estimating an approximate rank of a homomorphic ciphertext and a control method thereof. The electronic device includes: a communication device; a memory storing at least one instruction; and a processor connected to the memory and configured to control the electronic device, wherein the processor obtains N homomorphic ciphertexts; generates K knots for calculating approximate ranks, K being a number smaller than N; and calculates approximate ranks of the N homomorphic ciphertexts based on probabilities that the N homomorphic ciphertexts exist between the K knots.

10 Claims, 7 Drawing Sheets

| X | $\xi_1$ | $\cdots$ | $\xi_\ell$ | $\cdots$ | $\xi_L$ | RANK |
|---|---|---|---|---|---|---|
| $\in (\xi_{min}, \xi_1)$ | 0 | $\cdots$ | 0 | $\cdots$ | 0 | 1 |
| $\vdots$ | | | | | | |
| $\in [\xi_\ell, \xi_{\ell+1})$ | 1 | $\cdots$ | 1 | $\cdots$ | 1 | $n - a_\ell + 1$ |
| $\vdots$ | | | | | | |
| $\in [\xi_L, \xi_{max})$ | 1 | $\cdots$ | 1 | $\cdots$ | 1 | $n - a_L + 1$ |
| SUM | $a_1$ | $\cdots$ | $a_\ell$ | $\cdots$ | $a_L$ | |

Figure 5:
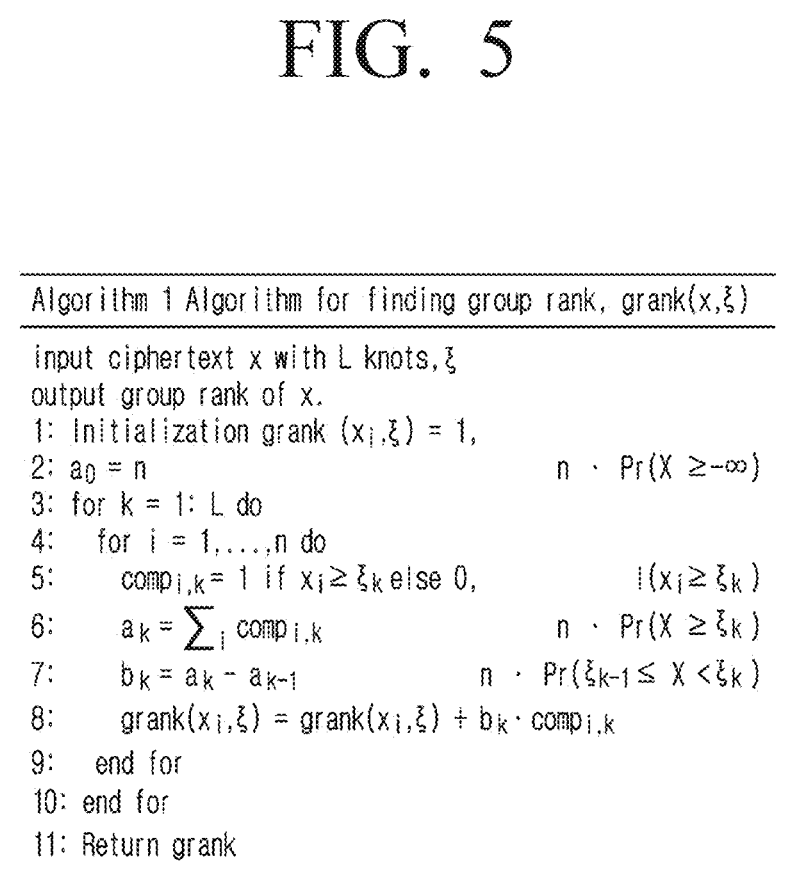

Algorithm 1 Algorithm for finding group rank, $grank(x, \xi)$

--- input ciphertext x with L knots, $\xi$ output group rank of x.

1: Initialization $grank(x_i, \xi) = 1$,

2: $a_0 = n$                                      $n \cdot Pr(X \geq -\infty)$

3: for $k = 1$: L do

4:     for $i = 1, \ldots, n$ do

5:        $comp_{i,k} = 1$ if $x_i \geq \xi_k$ else 0,          $I(x_i \geq \xi_k)$ 6:        $a_k = \sum_i comp_{i,k}$           $n \cdot Pr(X \geq \xi_k)$ 7:        $b_k = a_k - a_{k-1}$         $n \cdot Pr(\xi_{k-1} \leq X < \xi_k)$ 8:        $grank(x_i, \xi) = grank(x_i, \xi) + b_k \cdot comp_{i,k}$ 9:     end for 10: end for 11: Return grank

Figure 6:
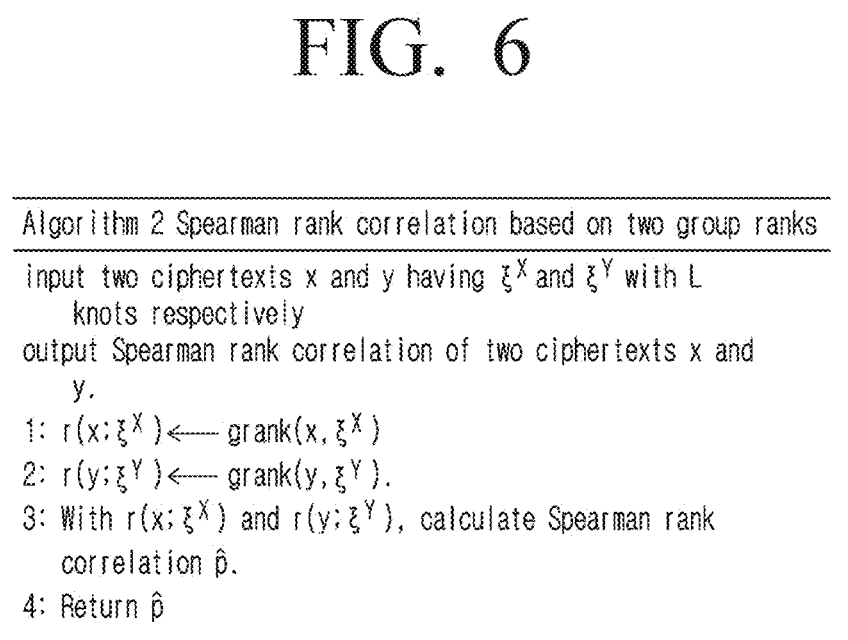

Algorithm 2 Spearman rank correlation based on two group ranks

--- input two ciphertexts x and y having $\xi^X$ and $\xi^Y$ with L
　　knots respectively output Spearman rank correlation of two ciphertexts x and
　　y.

1: $r(x;\xi^X) \longleftarrow grank(x,\xi^X)$

2: $r(y;\xi^Y) \longleftarrow grank(y,\xi^Y)$.

3: With $r(x;\xi^X)$ and $r(y;\xi^Y)$, calculate Spearman rank
　　correlation $\hat{\rho}$.

4: Return $\hat{\rho}$

FIG. 7

| n = s x 32768 | | # of knots | | | |
| --- | --- | --- | --- | --- | --- |
| | | 15 | 30 | 75 | 225 |
| s = 1 | elapsed time | 17.5s(0.022) | 31.46s(0.068) | 75.0s(0.089) | 219s(0) |
| | MAD | 0.0011(0.0010) | 0.0006(0.0004) | 0.0002(0.0001) | 0.0001 (0.0001) |
| s = 2 | elapsed time | 32.4s(0) | 60.0s (0) | 146.0s(0) | 431.0s(0) |
| | MAD | 0.0006(0.0005) | 0.0004(0.0002) | 0.0002(0.0001) | 0.0001(0.0001) |
| s = 3 | elapsed time | 47.3s(0) | 88.59s(0.031) | 217.0s(0) | 642.15s(0.366) |
| | MAD | 0.0008(0.0004) | 0.0003(0.0003) | 0.0001(0.0001) | 0.0001 (0.0001) |
| s = 4 | elapsed time | 62.2s(0) | 117.0s(0) | 288.4s (0.503) | 885.15s(1.226) |
| | MAD | 0.0005(0.0004) | 0.0004(0.0003) | 0.0002(0.0002) | 0.0002(0.0004) |

ELECTRONIC DEVICE FOR ESTIMATING APPROXIMATE RANK OF HOMOMORPHIC CIPHERTEXT AND CONTROL METHOD THEREOF

CROSS REFERENCE TO RELATED APPLICATIONS

The present application is a U.S. Non-Provisional patent application that claims priority to Korean Patent Application No. 10-2023-0113667 filed on Aug. 29, 2023, Korean Patent Application No. 10-2023-0140678 filed on Oct. 19, 2023, Korean Patent Application No. 10-2024-0015982 filed on Feb. 1, 2024, and Korean Patent Application No. 10-2024-0106378 filed on Aug. 8, 2024, the contents of all of which are being incorporated by reference in their entirety.

TECHNICAL FIELD

The disclosure relates to an electronic device for estimating an approximate rank of a homomorphic ciphertext and a control method thereof, and more specifically, to an electronic device for estimating an approximate rank of a homomorphic ciphertext using a knot, which is an auxiliary tool for estimating an approximate rank, and a control method thereof.

BACKGROUND ART

As the communication technology is developed and the spread of electronic devices become active, efforts are continuously being made to maintain communication security between the electronic devices. Accordingly, the encryption/decryption technology is used in most communication environments.

When a message encrypted by the encryption technology is transmitted to a counterpart, the counterpart needs to decrypt the message to use the message. In this case, the counterpart wastes resources and time in the process of decrypting the encrypted data. In addition, there has also been a problem that, if a third party hacks in a state where the counterpart has temporarily decrypted the message for operations, the message is easily leaked to the third party.

To solve this problem, homomorphic encryption methods are being studied. According to homomorphic encryption, even if operations are performed on a ciphertext itself without decrypting encrypted information, the same result as the value encrypted after performing operations on the plaintext can be obtained. Therefore, various operations can be performed without decrypting the ciphertext.

Meanwhile, in data analysis, a rank is a basic statistic for obtaining a key statistic. The ranks of data can be basically estimated by a bitonic sorting method. The bitonic sorting method is a comparison-based sorting algorithm that may be performed efficiently, especially through parallel processing. The bitonic sorting method is mainly used for parallel computing, and has time complexity of $O(\log^2 n)$ in sorting n elements. This bitonic sorting method converts the data to be sorted into a bitonic sequence, and then merges the converted bitonic sequence to create a sorted sequence.

However, there is a problem that the bitonic sorting method is not capable of obtaining an index for obtaining a general rank of a data value because the bitonic sorting method is performed in a state where the value of the homomorphic ciphertext, which is in a homomorphically encrypted state, and the index of the homomorphic ciphertext are simultaneously encrypted.

In addition, a rank of individual data may be computed through $O(n^2)$ comparison, which has higher calculation complexity, but there is a limitation that it takes too much time.

Furthermore, there is a problem that it is not possible to obtain a Spearman rank correlation coefficient because ranks computed through independent operations from two respective variables are not paired.

DISCLOSURE

Technical Problem

The disclosure provides an electronic device for estimating an approximate rank of a homomorphic ciphertext using an auxiliary tool for estimating an approximate rank, and a control method thereof.

Technical Solution

According to an embodiment of the disclosure, an electronic device for estimating an approximate rank of a homomorphic ciphertext includes: a communication device; a memory storing at least one instruction; and a processor connected to the memory and configured to control the electronic device, wherein the processor obtains N homomorphic ciphertexts; generates K knots for calculating approximate ranks, K being a number smaller than N; and calculates approximate ranks of the N homomorphic ciphertexts based on probabilities that the N homomorphic ciphertexts exist between the K knots.

The processor may calculate the approximate ranks of the N homomorphic ciphertexts according to the following formula:

$$r'_i = r'(x_i; \xi) = N \sum_{j=1}^{k} Pr(\xi_{j-1} \le x_i < \xi_j) \cdot I(\xi_j \le x_i)$$

where $x_i$ denotes a homomorphic ciphertext, $r_i'$ denotes an approximate rank of the homomorphic ciphertext, $Pr(\xi_{j-1} \le x_i < \xi_j)$ denotes a probability that $x_i$ exists between $\xi_{j-1}$ and $\xi_j$, and $I(\xi \le x_i)$ denotes a function that is 1 when $\xi_j \le x_i$, and 0 otherwise.

The K notes may have values between maximum and minimum values of the N homomorphic ciphertexts.

Intervals between the K knots may be equal.

The processor may obtain N first homomorphic ciphertexts and N second homomorphic ciphertexts; and obtain a Spearman rank correlation coefficient of the first homomorphic ciphertexts and the second homomorphic ciphertexts based on approximate ranks of the first homomorphic ciphertexts and the second homomorphic ciphertexts.

According to another embodiment of the disclosure, a control method of an electronic device for estimating an approximate rank of a homomorphic ciphertext includes: obtaining N homomorphic ciphertexts; generating K knots for calculating approximate ranks, K being a number smaller than N; and calculating approximate ranks of the N homomorphic ciphertexts based on probabilities that the N homomorphic ciphertexts exist between the K knots.

In the calculating of the approximate ranks of the N homomorphic ciphertexts, the approximate ranks of the N homomorphic ciphertexts may be calculated according to the following formula:

$$r_i' = r'(x_i; \xi) = N \sum\nolimits_{j=1}^{k} Pr(\xi_{j-1} \leq x_i < \xi_j) \cdot I(\xi_j \leq x_i)$$

where $x_i$ denotes a homomorphic ciphertext, $$r_i'$$

denotes an approximate rank of the homomorphic ciphertext, $Pr(\xi_{j-1} \leq x_i < \xi_j)$ denotes a probability that $x_i$ exists between $\xi_{j-1}$ and $\xi_j$, and $I(\xi_j \leq x_i)$ denotes a function that is 1 when $\xi \leq x_i$, and 0 otherwise.

The K notes may have values between maximum and minimum values of the N homomorphic ciphertexts.

Intervals between the K knots may be equal.

In the obtaining of the N homomorphic ciphertexts, N first homomorphic ciphertexts and N second homomorphic ciphertexts may be obtained; and the control method may further include: obtaining a Spearman rank correlation coefficient of the first homomorphic ciphertexts and the second homomorphic ciphertexts based on approximate ranks of the first homomorphic ciphertexts and the second homomorphic ciphertexts.

Advantageous Effects

As described above, by estimating an approximate rank of a homomorphic ciphertext using a knot, which is an auxiliary indicator, a nonparametric method can be used in obtaining a rank correlation coefficient, thereby obtaining a more robust statistic even in an encrypted state. In addition, since the nonparametric method is not distribution-dependent, an approximate rank can be more efficiently predicted even in encrypted states where it is difficult to verify distribution.

BRIEF DESCRIPTION OF DRAWINGS

FIG. 2 is a block diagram showing a configuration of an operational device according to an embodiment of the disclosure.

FIG. 4 is a diagram for explaining a method for estimating a rank of a homomorphic ciphertext according to an embodiment of the disclosure.

FIG. 5 is a diagram showing an algorithm for estimating a rank of a homomorphic ciphertext according to an embodiment of the disclosure.

FIG. 6 is a diagram showing an algorithm for obtaining a Spearman rank correlation coefficient based on ranks of two homomorphic ciphertexts according to an embodiment of the disclosure.

FIG. 7 is a table showing a calculation rate and a mean absolute error depending on the size of homomorphic ciphertexts and the number of knots according to an embodiment of the disclosure.

BEST MODE FOR CARRYING OUT THE INVENTION

Figure 1:
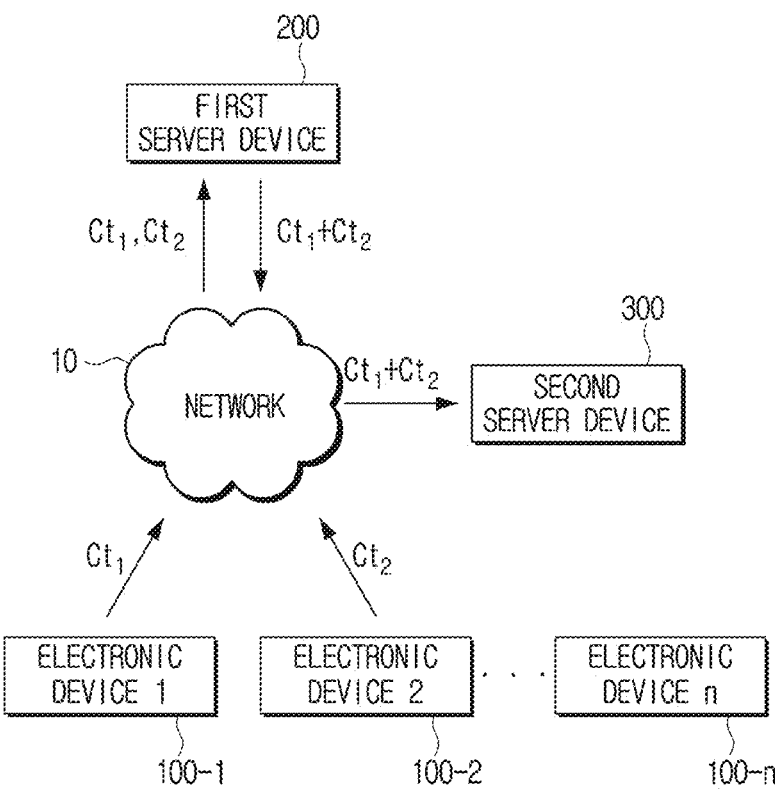
FIG. 1 is a diagram for explaining a structure of a network system according to an embodiment of the disclosure.

Hereinafter, the disclosure will be described in detail with reference to the accompanying drawings. Encryption/decryption may be applied to an information (data) transmission process performed in the disclosure if needed, and expressions for describing the information (data) transmission process in the disclosure and claims are to be construed as including encryption/decryption, even if not mentioned separately. An expression in the form of "transmission (transfer) from A to B" or "reception by A from B" in the disclosure includes transmission (transfer) or reception by an intermediate medium, and is not necessarily limited only to direct transmission (transfer) from A to B or direct reception by A from B.

In the description of the disclosure, the order of each step should be understood to be non-limiting unless a preceding step should be performed logically and temporally before a following step. That is, except for the exceptional cases as described above, even if a process described as a following step is performed before a process described as a preceding step, the nature of the disclosure is not affected thereby and the scope of right should be defined regardless of the order of the steps. In addition, "A or B" is defined herein to mean not only selectively referring to either A or B, but also including both A and B. In addition, the term "comprise" in the disclosure has a comprehensive meaning to further include another component in addition to elements enumerated to be included.

In the disclosure, only essential components necessary for the description of the disclosure are described, and components not related to the essence of the disclosure are not mentioned. The disclosure should not be construed in an exclusive sense to include only the mentioned components, but should be interpreted in a non-exclusive sense to include other components as well.

In the disclosure, the term "value" is defined as a concept including not only a scalar value but also a vector. In the disclosure, an expression such as "compute" or "calculate" may be replaced with an expression indicating that a computation or calculation result is produced. In addition, the operation on ciphertexts to be described below refers to homomorphic operation unless otherwise mentioned. For example, addition of homomorphic ciphertexts refers to homomorphic addition of two homomorphic ciphertexts.

A mathematical operation or computation of each step in the disclosure to be described below may be implemented as a computer operation by a known coding method for performing the operation or computation and/or by coding designed to suit the disclosure.

Specific formulas to be described below are exemplarily described among various possible alternatives, and the scope of the disclosure should not be construed as being limited to the formulas mentioned in the disclosure.

For convenience of description, the following notations will be used in the disclosure.

a←D: Element (a) is selected according to distribution (D).

s1, s2∈R: S1, S2: Each of S1 and S2 is an element belonging to set R.

mod(q): A modular operation is performed with element q.

$\lceil \cdot \rceil$: An internal value is rounded up.

Hereinafter, various embodiments of the disclosure will be described in detail with reference to the accompanying drawings.

FIG. 1 is a diagram for explaining a structure of a network system according to an embodiment of the disclosure.

Referring to FIG. 1, the network system may include a plurality of electronic devices 100-1 to 100-n, a first server device 200, and a second server device 300, which may be connected to each other through a network 10.

The network 10 may be implemented as various types of wired and wireless communication networks, broadcast communication networks, optical communication networks, and cloud networks, and the devices may be connected to each other by a method such as Wi-Fi, Bluetooth, and near field communication (NFC) without a separate medium.

Although it is shown in FIG. 1 that there are a plurality of electronic devices 100-1 to 100-n, it is not necessary that the plurality of electronic devices are used and one device may be used.

As an example, the electronic devices 100-1 to 100-n may be implemented as various types of devices such as smartphones, tablets, game players, PCs, laptop PCs, home servers, and kiosks, and may be also implemented in the form of home appliances to which IoT functions are applied.

Users may input various kinds of information through the electronic devices 100-1 to 100-n used by the users.

The input information may be stored in the electronic devices 100-1 to 100-n themselves, but may also be transmitted to and stored in an external device for the reasons of storage capacity and security. In FIG. 1, the first server device 200 may serve to store such information, and the second server device 300 may serve to use some or all of the information stored in the first server device 200.

Each of the electronic devices 100-1 to 100-n may homomorphically encrypt the input information and transmit a homomorphic ciphertext to the first server device 200.

Each of the electronic devices 100-1 to 100-n may include encryption noise, i.e., an error, generated in the process of performing the homomorphic encryption, in the ciphertext. Specifically, the homomorphic ciphertext generated by each of the electronic devices 100-1 to 100-n may be generated in such a manner that a result value including a message and an error value are restored when the homomorphic ciphertext is decrypted using a secret key later.

As an example, homomorphic ciphertexts generated by the electronic devices 100-1 to 100-n may be generated in such a manner that the following properties are satisfied when the homomorphic ciphertexts are decrypted using secret keys.

$$Dec(ct, sk) = \, < ct, sk > = M + e(\mathrm{mod}q) \qquad \text{[Formula 1]}$$

Here, <, > denotes a usual inner product, ct denotes a ciphertext, sk denotes a secret key, M denotes a plaintext message, e denotes an encryption error value, and mod q denotes a ciphertext modulus. It is required that q be chosen to be larger than a result value M obtained by multiplying the message by a scaling factor $\Delta$. If the absolute value of the error value e is sufficiently smaller than M, a decryption value M+e of the ciphertext is a value that may replace the original message with the same precision in calculating the number of significant digits. Among the decrypted data, an error may be placed on the least significant bit (LSB) side, and M may be placed on the next least significant bit side.

If the size of the message is too small or too large, the size may be adjusted using a scaling factor. The use of the scaling factor makes it possible to encrypt not only an integer-type message but also a real-type message, thereby greatly increasing usability. Furthermore, by adjusting the size of the message using the scaling factor, a size of the valid area, i.e., an area where messages exist in the ciphertext after the operation is performed, may also be adjusted.

Depending on embodiments, the ciphertext modulus q may be set and used in various forms. As an example, the ciphertext modulus may be set in the form of an exponential value $q=\Delta^L$ of the scaling factor $\Delta$. If $\Delta$ is 2, then the ciphertext modulus may be set to a value such as $q=2^{10}$.

In addition, although the homomorphic ciphertext according to the disclosure will be described assuming that a fixed point is used, it may also be applied to a case where a floating point is used.

The first server device 200 may store the received homomorphic ciphertext in a ciphertext state without decrypting the homomorphic ciphertext. The second server device 300 may request a specific processing result for the homomorphic ciphertext to the first server device 200. According to the request of the second server device 300, the first server device 200 may perform a specific operation and then transmit a result to the second server device 300.

As an example, when ciphertexts ct1 and ct2 transmitted by the two electronic devices 100-1 and 100-2 are stored in the first server device 200, the second server device 300 may request a value obtained by summing up the information provided from the two electronic devices 100-1 and 100-2 to the first server device 200. According to the request, the first server device 200 may perform an operation to add the two ciphertexts, and then transmit a result value (ct1+ct2) to the second server device 300.

Due to the nature of homomorphic ciphertext, the first server device 200 may perform an operation without decrypting the homomorphic ciphertexts, and the result value is also in the ciphertext form. In the disclosure, the result value obtained by the operation is called an operation result ciphertext.

The first server device 200 may transmit the operation result ciphertext to the second server device 300. The second server device 300 may decrypt the received operation result ciphertext, and obtain an operation result value of data included in each of the homomorphic ciphertexts.

Meanwhile, although the case is shown in FIG. 1 where encryption is performed by the first electronic device and the second electronic device, and decryption is performed by the second server device, but the disclosure is not necessarily limited thereto.

In addition, the first server device 200 (or the electronic device 100) may obtain an approximate rank (or a group rank) for a homomorphic ciphertext. In particular, the first server device 200 may obtain N homomorphic ciphertexts, generate K knots (knots) for calculating approximate ranks, and calculate approximate ranks of the N homomorphic ciphertexts based on probabilities that the N homomorphic ciphertexts exist between the K knots. Here, K may be a number smaller than N.

Specifically, the first server device 200 may calculate an approximate rank of a homomorphic ciphertext according to Formula 2 below.

$$r'_i = r'(x_i; \xi) = N \sum\nolimits_{j=1}^{k} Pr(\xi_{j-1} \leq x_i < \xi_j) \cdot I(\xi_j \leq x_i) \qquad \text{[Formula 2]}$$

Here, $x_i$ may denote a homomorphic ciphertext, $$r'_i$$

may denote an approximate rank of the homomorphic ciphertext, $Pr(\xi_{j-1} \leq x_i < \xi_j)$ may denote a probability that $x_i$ exists between $\xi_{j-1}$ and $\xi_j$, $I(\xi_j \leq x_i)$ may denote a function that is 1 when $\xi \leq x_i$, and 0 otherwise.

Meanwhile, in one or more embodiments, the K knots may have values between maximum and minimum values of the N homomorphic ciphertexts. In addition, intervals between the K knots may be equal.

What has been described above will be explained in detail below.

As described above, by estimating the approximate ranks of the plurality of homomorphic ciphertexts using the knots, which are auxiliary tools for predicting approximate ranks of homomorphic ciphertexts, the time and cost required for finding the approximate rank in homomorphic ciphertext can be greatly reduced.

Figure 2:
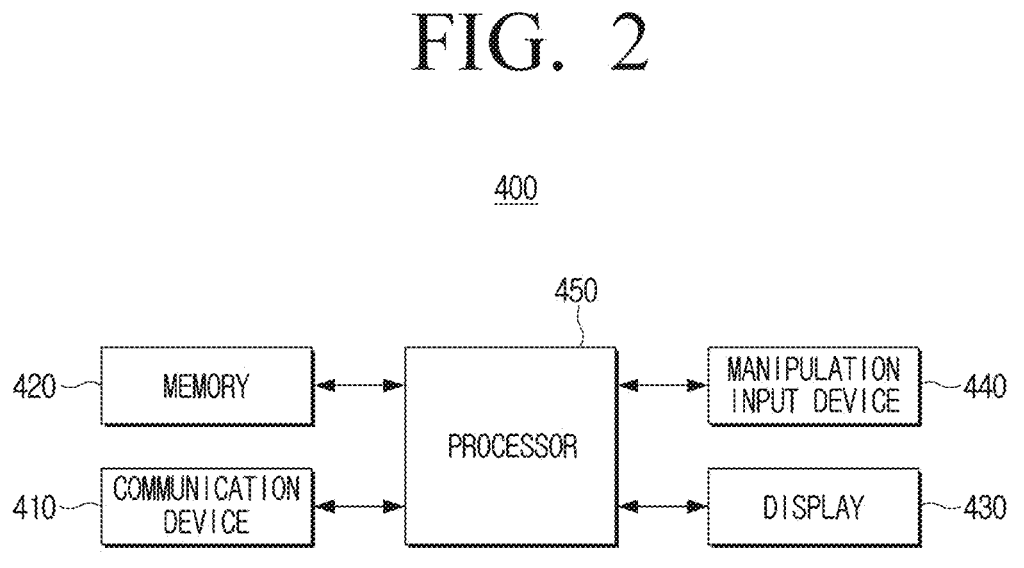

FIG. 2 is a block diagram showing a configuration of an operational device according to an embodiment of the disclosure.

Specifically, in the system of FIG. 1, not only a device that performs homomorphic encryption, such as the electronic device, but also a device that performs an operation for a homomorphic ciphertext, such as the first server device, and a device that decrypts the homomorphic ciphertext, such as the second server device, may also be referred to as electronic devices. These electronic devices may be various devices such as personal computers (PCs), notebooks, smartphones, tablets, and servers.

Referring to FIG. 2, an electronic device 400 may include a communication device 410, a memory 420, a display 430, a manipulation input device 440, and a processor 450.

The communication device 410 is formed to connect the electronic device 400 to an external device (not shown), and may be connected to the external device not only via a local area network (LAN) and the Internet but also via a universal serial bus (USB) port or a wireless communication (e.g., WiFi 802.11a/b/g/n, NFC, Bluetooth) port. The communication device 410 may also be referred to as a transceiver.

The communication device 410 may receive a public key from the external device, and may transmit a public key generated by the electronic device 400 itself to the external device.

In addition, the communication device 410 may receive a message from the external device and transmit a generated homomorphic ciphertext to the external device. In an embodiment, the communication device 410 may obtain N homomorphic ciphertexts from a plurality of external devices.

In addition, the communication device 410 may receive various parameters necessary for generating a ciphertext from an external device. Meanwhile, when the disclosure is embodied, various parameters can be directly input by a user through the manipulation input device 440 to be described below.

In addition, the communication device 410 may be requested to perform an operation on a homomorphic ciphertext from an external device, and may transmit a calculation result to the external device. In an embodiment, the communication device 410 may transmit results for extreme values (e.g., maximum or minimum values) of a plurality of homomorphic ciphertexts to an external device.

The memory 420 is a component for storing an O/S for driving the electronic device 400, various types of software, and data. The memory 420 may be implemented in various forms such as RAM, ROM, flash memory, HDD, external memory, memory card, and the like, and is not limited to any one of them.

The memory 420 stores a message to be encrypted. Here, the message may be various types of credit information, personal information, and the like cited by the user, and may also be information related to usage history, such as location information and Internet usage time information used by the electronic device 400.

In addition, the memory 420 may store a public key. If the electronic device 400 is a device that directly generates a public key, the memory 420 may store not only a secret key, but also various parameters necessary for generating the public key and the secret key.

In addition, the memory 420 may store a homomorphic ciphertext generated by the electronic device 100. In addition, the memory 420 may also store a homomorphic ciphertext transmitted from an external device.

In addition, the memory 420 may store various modules or functions for obtaining extreme values of a plurality of (N) homomorphic ciphertexts obtained by the electronic device 100. As an example, the memory 420 may store a plurality of functions obtained using a Boltzmann operator.

The display 430 displays a user interface window for selecting a function supported by the electronic device 400. Specifically, the display 430 may display a user interface window for selecting various functions provided by the electronic device 400. The display 430 may be a monitor such as a liquid crystal display (LCD) and an organic light emitting diode (OLED), or may be implemented as a touch screen capable of simultaneously performing the function of the manipulation input device 440 to be described below.

The display 430 may display a message requesting inputs of parameters required to generate a secret key and a public key. In addition, the display 430 may display a message for selecting a message that is an encryption target. Meanwhile, when the disclosure is embodied, the encryption target may be selected directly by the user, or may be selected automatically. That is, personal information or the like requiring encryption may be set automatically even if the user does not directly select a message.

The manipulation input device 440 may receive a selection of a function of the electronic device 400 and a command for controlling the function from the user. Specifically, the manipulation input device 440 may receive parameters required for generating a secret key and a public key from the user. In addition, the manipulation input device 440 may receive a message to be encrypted from the user.

In an embodiment, the manipulation input device 440 may receive a user command for obtaining extreme values of a plurality of homomorphic ciphertexts. The processor 450 controls each component in the electronic device 400. The processor 450 may include a single device, such as a central processing unit (CPU) or an application-specific integrated circuit (ASIC), or may include multiple devices, such as a CPU and a graphics processing unit (GPU).

In this case, the processor 450 may have an architecture capable of processing 32-bit data at once. When a message to be transmitted is input, the processor 450 stores the message in the memory 420. The processor 450 homogeneously encrypts the message using various setting values and programs stored in the memory 420. In this case, a public key may be used.

The processor 450 may generate a public key required to perform encryption by itself to use the public key, or may receive a public key required to perform encryption from an external device to use the public key. As an example, the second server device 300, which performs decryption, may distribute a public key to other devices.

In a case where the processor 450 generates a key by itself, the processor 450 may generate a public key using a Ring-LWE technique. Specifically, the processor 450 may first set various parameters and rings and store the parameters and the rings in the memory 420. Examples of the parameters may include a length of a plaintext message bit, a size of a public key, a size of a secret key, etc.

The ring may be expressed as Formula 3.

$$R = Z_q[X]/f(x) \qquad \text{[Formula 3]}$$

Here, R is a ring, Zq is a coefficient, and f(x) is an nth-order polynomial.

The ring is a set of polynomials with preset coefficients, where addition and multiplication are defined between elements, which refers to a set that is closed with respect to addition and multiplication.

As an example, the ring refers to a set of n-th order polynomials with a coefficient Zq. Specifically, the ring refers to polynomials each produced as the remainder obtained by dividing a polynomial by an N-th cyclotomic polynomial when n is $\Phi(N)$. (f(x)) represents an ideal of Zq[x] generated by f(x). The Euler totient function $\Phi(N)$ is the number of natural numbers coprime to N and smaller than N. If $\Phi_N(x)$ is defined as an N-th cyclotomic polynomial, the ring may also be expressed as Formula 4 below.

$$R = Z_q[X]/\Phi_N(x) \qquad \text{[Formula 4]}$$

The secret key sk may be expressed as follows.

Meanwhile, the ring of Formula 3 above has a complex number in a plaintext space. Meanwhile, in order to improve the speed for operating a homomorphic ciphertext, only a set of which a plaintext space is a real number may be used among the sets of the ring described above.

Once such a ring is established, the processor 450 may compute a secret key sk from the ring.

$$sk \leftarrow (1, s(x)), s(x) \in R \qquad \text{[Formula 5]}$$

Here, s(x) denotes a polynomial randomly generated with small coefficients.

In addition, the processor 450 computes a first random polynomial (a(x)) from the ring.

The first random polynomial may be expressed as follows.

$$a(x) \leftarrow R \qquad \text{[Formula 6]}$$

In addition, the processor 450 may compute an error. Specifically, the processor 450 may extract an error from a discrete Gaussian distribution or a distribution having a statistical distance close thereto. Such an error may be expressed as follows.

$$e(x) \leftarrow D_{\alpha q}^n \qquad \text{[Formula 7]}$$

Once the error is generated, the processor 450 may compute a second random polynomial by modularizing the error to the first random polynomial and the secret key. The second random polynomial may be expressed as follows.

$$b(x) = -a(x)s(x) + e(x)(\mathrm{mod}q) \qquad \text{[Formula 8]}$$

Finally, a public key pk is set as follows, including the first random polynomial and the second random polynomial.

$$pk = (b(x), a(x)) \qquad \text{[Formula 9]}$$

The above-described key generation method is merely an example, and the disclosure is not necessarily limited thereto, and it goes without saying that public keys and secret keys may be generated using other methods.

Meanwhile, once the public key is generated, the processor 450 may control the communication device 410 to transmit the public key to other devices.

Then, the processor 450 may generate a homomorphic ciphertext for the message.

Specifically, the processor 450 may generate a homomorphic ciphertext by applying a previously generated public key to the message. At this time, the processor 450 can generate the ciphertext in such a manner that its length corresponds to the size of the scaling factor Δ.

Once the homomorphic ciphertext is generated, the processor 450 may store the homomorphic ciphertext in the memory 420 or control the communication device 410 to transmit the homomorphic ciphertext to another device according to a user request or a preset default command.

Meanwhile, the processor 450 may calculate an approximate rank of the homomorphic ciphertext using a knot, which is an auxiliary indicator for estimating the approximate rank of the homomorphic ciphertext. This will be described in more detail with reference to FIG. 3.

Figure 3:
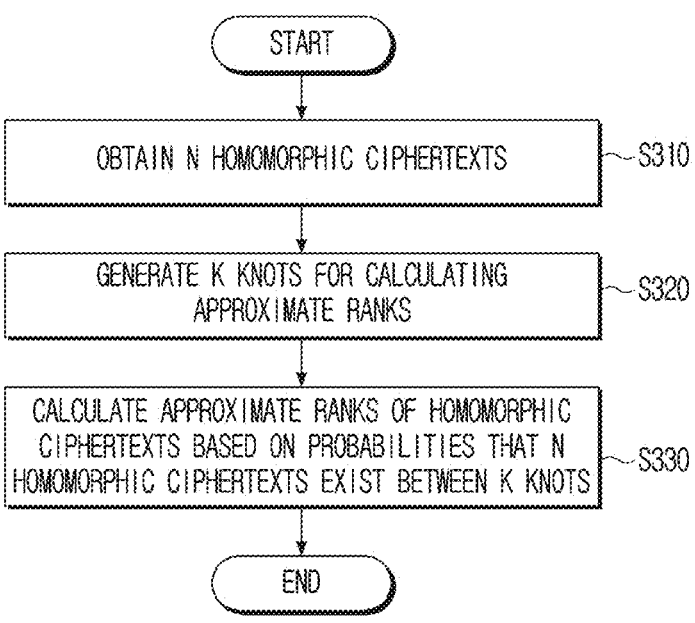
FIG. 3 is a flowchart for explaining an electronic device for estimating an approximate rank of a homomorphic ciphertext and a control method thereof according to an embodiment of the disclosure.

FIG. 3 is a flowchart for explaining an electronic device for estimating an approximate rank of a homomorphic ciphertext and a control method thereof according to an embodiment of the disclosure.

First, the electronic device 100 obtains N homomorphic ciphertexts (S310). Specifically, the electronic device 100 may obtain a plurality of homomorphic ciphertexts from an external device, or obtain a plurality of homomorphic ciphertexts stored in the electronic device 100. Here, the homomorphic ciphertexts may be data in which various types of data are encrypted by a homomorphic encryption algorithm.

At this time, the N homomorphic ciphertexts may be obtained in the form of a vector $(x=x_1, \ldots, x_N)$ of length N. Here, x may be a homomorphic ciphertext.

In addition, the electronic device 100 generates K knots for calculating approximate ranks (S320). At this time, the knot is an auxiliary indicator for calculating an approximate rank of a homomorphic ciphertext, and may be a value for comparison with the homomorphic ciphertext. Specifically, when a plurality of homomorphic ciphertexts are compared with each other to obtain ranks of the plurality of homomorphic ciphertexts, a lot of time and so many operations are required. For example, 6 hours are needed to sort about four million data (about $32,768 \times 12$) using a bitonic sorting method. However, in an embodiment of the disclosure, in order to reduce the calculation amount, approximate ranks of homomorphic ciphertexts may be calculated (or estimated) by comparing the homomorphic ciphertexts with K knots, rather than comparing the plurality of homomorphic ciphertexts with each other.

In particular, the electronic device 100 may obtain the K knots in the form of a vector $(\xi=\xi_1, \ldots, \xi_k)$ of length k.

Meanwhile, K may be a number smaller than N. That is, the number of knots may be smaller than the number of homomorphic ciphertexts. In addition, one or more homomorphic ciphertexts may be included between adjacent knots.

According to one or more embodiments, the K knots may have values between maximum and minimum values of the N homomorphic ciphertexts, as shown in Formula 10 below.

$$x_{min} \le \xi_1 < \cdots < \xi_K \le x_{max} \qquad \text{[Formula 10]}$$

Here, $x_{min}$ and $x_{max}$ may denote a minimum value and a maximum value, respectively, among input values of x.

In addition, intervals between the K knots may be equal. However, this is merely an embodiment, and it goes without saying that the intervals between the K knots may be random.

The electronic device 100 calculates approximate ranks of the N homomorphic ciphertexts based on probabilities that the N homomorphic ciphertexts exist between the K knots (S330).

At this time, the approximate rank may be called a group rank.

Specifically, the electronic device 100 may calculate the approximate ranks of the N homomorphic ciphertexts according to Formula 11 below.

$$r_i' = r'(x_i; \xi) = N \sum_{j=1}^{k} Pr(\xi_{j-1} \le x_i < \xi_j) \cdot I(\xi_j \le x_i) \qquad \text{[Formula 11]}$$

Here, $x_i$ may denote a homomorphic ciphertext, $$r_i'$$

may denote an approximate rank of the homomorphic ciphertext, $Pr(\xi_{j-1} \le x_i < \xi_j)$ may denote a probability that $x_i$ exists between $\xi_{j-1}$ and $\xi_j$, $I(\xi_j \le x_i)$ may denote a function that is 1 when $\xi_j \le x_i$, and 0 otherwise.

Specifically, by confining the ranking operations to cumulative distribution function (CDF) values of the designed points, the computational cost associated with estimating a Spearman rank correlation coefficient can be reduced. In particular, the method according to an embodiment of the disclosure is designed for parallel execution, thereby enhancing efficiency. If there are s-single instruction and multiple data (SIMD) blocks, the total number of comparisons will be sL. The results of these comparisons may be stored in a matrix with dimensions $(32,768 \times s) \times L$.

A probability of an event E may be represented by Pr(E). For a positive integer L, a knot of length L may be defined by a finite sequence $$\xi = \{\xi_j\}_{j=1}^{L}.$$

of real numbers such that $\xi 1 < \xi 2 < \ldots < \xi L$. This definition may be detailed further as follows. When knots of X are given as $\xi$ and $\eta$, $\eta$ may be finer than $\xi$. This means that, for any i, there may exist j such that $(\eta_j, \eta_{j+1})$ is a subset of $(\xi_i, \xi_{i+1})$, and there may exist $i_0$, $j_0$, and $(\eta_{j0}, \eta_{j0+1})$ that are subsets of $(\xi_{i0}, \xi_{i0+1})$. As L increases, there exists a sequence of knots that converges to $\xi$, such that every interval of $\xi$ may contain at most one element of X.

$\{X_{(1)}, \ldots, X_{(n)}\}$ may be order statistics of $\{X_1, \ldots, X_n\}$, where $X_{(1)} \le X_{(2)} \le \ldots \le X_{(n)}$. The empirical cumulative distribution function (ECDF) of x may be represented by Formula 12 below.

$$F_n(x) = \frac{1}{n} \sum_{i=1}^{n} I(X_i \le x) \qquad \text{[Formula 12]}$$

where a lower bound of X is $\xi\_min = -\Delta$. It may be assumed that knots are within the range of the observed data. For example, $X_{(1)} < \xi_1$ and $\xi_L < X_{(n)}$.

The approximate ECDF of X for knot $\xi$ may be defined as Formula 13.

$$F(x; \xi) = \sum_{j=1}^{L} I(\xi_j \le x)\hat{P}r(\xi_{j-1} \le X < \xi_j) \qquad \text{[Formula 13]}$$

$$\text{where } \xi_0 = \xi_{min} \text{ and}$$

$$\hat{P}r(\xi_{j-1} \le X < \xi_j) = \frac{1}{n} \sum_{i=1}^{n} I(\xi_{j-1} \le X_i < \xi_j).$$

Proposition 1 below demonstrates that $F(x;\xi)$ may be an approximation of ECDF.

Proposition 1.

Given data $\{X_1, \ldots, X_n\}$ and a knot $\xi$ of length L, Formula 14 below may be satisfied for any real number $x \in R$.

$$F(x; \xi) = F_n(\xi_* -) \qquad \text{[Formula 14]}$$

$$\text{where } \xi_*(x) = \max_{1 \le j \le L} \{\xi_j \mid \xi_j \le x\}.$$

Furthermore, if n is a knot of $\{X_1, \ldots, X_n\}$ satisfying $\xi \subset \eta$, Formula 15 below may be satisfied.

$$F(x; \xi) \le F(x; \eta) \le F_n(x) \qquad \text{[Formula 15]}$$

13                                  14

By only using L knots, $F(X_1;\xi), \ldots, F(X_n;\xi)$ can be obtained. Accordingly, the approximate rank of X for $i=1, \ldots, n$ may be defined by Formula 16 below.

$$r(X_i; \xi) = 1 + nF(X_i; \xi) \qquad \text{[Formula 16]}$$

This may be regarded as an estimate of rank. When L<n, there may be L distinct group ranks. If there is no confusion, it may be expressed that $F(x)=F(x;\xi)$ and $r(x)=r(x;\xi)$. According to Formula 13, it may be expressed that when $\xi_L<x$, $F(x;\xi)<1$. In other words, Formula 17 below may be satisfied.

$$\lim_{x\to\infty} F(x; \xi) < 1 \qquad \text{[Formula 17]}$$

Supposing that all the data are distinct, it may be assumed that $\xi L$ falls within the interval $X_{(n-1)}<\xi_L<X_{(n)}$. According to Formula 13, this may imply that $F(X_{(n)};\xi)=1-1/n$. In this case, $F(X_{(n)}+\in;\xi)=1-1/n$ for $\in >0$. Therefore, to become an adequate estimator of the CDF, it requires adding a $\xi_{max}$ that is larger than $X_{(n)}$ to the knot $\xi$. This leads to the definition in Formula 13, which is defined on an expanded knot $\xi'=\xi\cup\xi max$. However, when finding group rankings, since there is no need to compare with $\xi max$, the range of $\xi$ may be restricted to the range of the data.

For example, it may be assumed that there are two knots, $\xi 1$ and $\xi 2$, where $\xi_{min}$ and $\xi_{max}$ represent the lower and upper bounds of data, respectively. If x lies in $[\xi_2, \xi_{max})$, then the result of $x\geq\xi_2$ may be 1. Similarly, the result of $x\geq\xi_1$ may also be 1. Consequently, the result vector may be (1, 1) for this observation. Furthermore, the comparison vector with the range $[\xi_1, \xi_2)$ or $(\xi_{min}, \xi_1)$ may be (1, 0) or (0, 0), respectively. If $x\in[\xi_1, \xi_2)$, then the indicators of the range may be (1, 0). If their cumulative function is (0.7, 0.2, 0.1), then its ECDF value may be $1\cdot0.7+0\cdot0.2=0.7$. FIG. 4 shows comparison results when data are sorted.

FIG. 4 is a diagram for explaining a method for estimating a rank of a homomorphic ciphertext according to an embodiment of the disclosure.

Specifically, as shown in FIG. 4, when the homomorphic ciphertext (x) is located between $\xi_{min}$ and $\xi_1$, an approximate rank of the homomorphic ciphertext may be calculated as 1. In addition, when the homomorphic ciphertext (x) is located between $\xi_l$ and $\xi_{l+1}$, an approximate rank of the homomorphic ciphertext may be calculated as $n-a_{l+1}$. In this case, when the homomorphic ciphertext (x) is located between $\xi_L$ and $\xi_{max}$, an approximate rank of the homomorphic ciphertext may be calculated as $n-a_{l+1}$.

The boolean output of the comparison with $$\{\xi_i\}_{i=1}^L$$

is encrypted, rendering each comparison with $\xi_k$ unknown. However, the sum of them, $$\sum_{i=1}^n I(X_i > \xi_k),$$

may form a sufficient statistic that can be determined. To efficiently utilize the memory, the comparison results may be stored sequentially in a list rather than using a matrix storage method. As an example, the algorithm for calculating an approximate rank may be an algorithm shown in FIG. 5.

If a finer set lacks a hierarchical structure, the definition in Formula 13 may not ensure inequality. This may imply that the ECDF is not monotonic in knots. Hence, a case with a hierarchical structure may be considered. Proposition 2 may explain the monotonic property of the approximate rank according to a finer knot set.

Proposition 2

Assuming that given data (e.g., homomorphic ciphertext) is X, it may be supposed that $\xi$ and $\eta$ are knots of X such that $\xi\subset\eta$. Here, $\{r(X,\xi)\}$ and $\{r(X_i;\eta)\}$ may represent group ranks of X with respect to $\xi$ and $\eta$, respectively. Then, Formula 18 below may be satisfied.

$$r(X_i; \xi) \leq r(X_i; \eta) \leq r(X_i) \qquad \text{[Formula 18]}$$

Furthermore, if X has no ties, then Formula 19 below may be satisfied.

$$\bar{r}_\xi \leq \bar{r}_\eta \leq (n + 1)/2 \qquad \text{[Formula 19]}$$

Here, $\bar{r}_\xi$ and $\bar{r}_\eta$ may represent means for knot sets $\xi$ and $\eta$, respectively.

If it is assumed that the data are distinct, Proposition 2 may imply that the upper bound approaches $(n+1)/2$ as the knots form a finer set. Since the ECDF exhibits jumps of size $1/n$ at different data points, the following theorem can be proven.

(Theorem 1) With the knot $\xi_i=X_i$ $(i=1, \ldots, n)$, the approximate rank $r(X_i;\xi)=1+nF(X_i;1)$ may be similar to the actual rank. When the number of elements in the group is 1, the group rank may be a usual rank.

Theorem 1 may imply that when using n knots, $O(n^2)$ comparisons are needed.

Using the approximate ranks of the homomorphic ciphertexts calculated (or estimated) in the above-described manner, the electronic device 100 may compute approximations of various nonparametric statistics that could not be calculated in existing homomorphic encryption.

In an embodiment, the electronic device 100 may obtain N first homomorphic ciphertexts and N second homomorphic ciphertexts. Then, the electronic device 100 may obtain a Spearman rank correlation coefficient of the first homomorphic ciphertexts and the second homomorphic ciphertexts based on the approximate ranks of the first homomorphic ciphertexts and the second homomorphic ciphertexts.

Specifically, the Spearman rank correlation coefficient, which may be nonparametrically computed without relying on the scale of data, is a widely used statistic along with a Pearson's correlation coefficient. In the meantime, a Spearman rank correlation coefficient of homomorphic ciphertexts could not be obtained because the ranks computed through independent operations on homomorphic ciphertexts were not paired.

The Spearman rank correlation coefficient may be obtained as shown in Formula 20, when $r_i$ and $s_i$ are ranks of first data $X_i$ and the second data $Y_i$, respectively.

$$\rho(r, s) = \frac{\sum_{i=1}^N (r_i - \bar{r})(s_i - \bar{s})}{\sqrt{\sum_{i=1}^N (r_i - \bar{r})^2}\sqrt{\sum_{i=1}^N (s_i - \bar{s})^2}} \qquad \text{[Formula 20]}$$

-continued $$\text{Here, } \bar{r} = \frac{1}{N} \sum_{i=1}^{N} r_i, \bar{s} = \frac{1}{N} \sum_{i=1}^{N} s_i.$$

Therefore, the electronic device 100 may obtain an approximate Spearman rank correlation coefficient using the approximate ranks (or group ranks) as shown in FIG. 3.

Specifically, the electronic device 100 may obtain first homomorphic ciphertexts x and second homomorphic ciphertexts y that are data having the same length. Here, the homomorphic ciphertexts may be data in which various types of data are encrypted by a homomorphic encryption algorithm.

At this time, the first homomorphic ciphertexts may be obtained in the form of a vector $(x=x_1, \ldots, x_N)$ of length N, and the second homomorphic ciphertexts may be obtained in the form of a vector $(y=y_1, \ldots, y_N)$ of length N.

The electronic device 100 may generate K first knots and K second knots for calculating approximate ranks. In particular, the electronic device 100 may obtain the K first knots in the form of a vector $(\xi=\xi_1, \ldots, \xi_N)$ of length k, and may obtain the K second knots in the form of a vector $(\eta=\eta_1, \ldots, \eta_N)$ of length k. As shown in Formula 21 below, the first knots may have values between maximum and minimum values of the N first homomorphic ciphertexts, and the second knots may have values between maximum and minimum values of the N second homomorphic ciphertexts.

$$x_{min} \leq \xi_1 < \ldots < \xi_K \leq x_{max} \qquad \text{[Formula 21]}$$

$$y_{min} \leq \eta_1 < \ldots < \eta_K \leq y_{max}$$

Here, $x_{min}$ and $x_{max}$ may denote a minimum value and a maximum value, respectively, among input values of x, and $y_{min}$ and $y_{max}$ may denote a minimum value and a maximum value, respectively, among input values of y.

In addition, as shown in Formula 22, the electronic device 100 may calculate approximate ranks $$r'_J \text{ and } s'_J$$

of the first and second homomorphic ciphertexts using the respective knots $\xi$ and $\eta$ for the first homomorphic ciphertexts x and the second homomorphic ciphertexts y having the same length.

$$r_i = r(x_i; \xi) = N \sum_{j=1}^{k} Pr(\xi_{j-1} \leq x < \xi_j) \cdot I(\xi_j \leq x_i) \qquad \text{[Formula 22]}$$

$$s_i = r(y_i; \eta) = N \sum_{j=1}^{k} Pr(\eta_{j-1} \leq y < \eta_j) \cdot I(\eta_j \leq y_i)$$

In addition, the electronic device 100 may obtain a Spearman rank correlation coefficient of the first homomorphic ciphertexts and the second homomorphic ciphertexts by using Formula 23 below.

$$\rho(r', s') = \frac{\sum_{i=1}^{N} (r'_i - \bar{r'})(s'_i - \bar{s'})}{\sqrt{\sum_{i=1}^{N} (r'_i - \bar{r'})^2} \sqrt{\sum_{i=1}^{N} (s'_i - \bar{s'})^2}} \qquad \text{[Formula 23]}$$

-continued $$\text{Here, } \bar{r'} = \frac{1}{N} \sum_{i=1}^{N} r'_i, \bar{s'} = \frac{1}{N} \sum_{i=1}^{N} s'_i.$$

In particular, if the size of knots § and n increases in a finer manner so that the first homomorphic ciphertexts and the second homomorphic ciphertexts are included in the respective sections, each approximate rank converges to the actual rank. Since the function $\rho(x, y)$ is a continuous function, it can be seen that $\rho(r', s') \to \rho(r, s)$ if the size of knots increases in a finer manner. Therefore, when using knots of sufficiently large size, $\rho(r', s')$ is close to $\rho(r, s)$, so the electronic device 100 may obtain a Spearman rank correlation coefficient using the approximate ranks. Meanwhile, the error of Spearman correlation coefficient may depend on the size and fineness of the knots.

In particular, the electronic device 100 may obtain a Spearman rank correlation coefficient of the first and second homomorphic ciphertexts using an algorithm shown in FIG. 6.

The group rank calculation method used in calculating the rank correlation coefficient described above may also be used to quickly find extreme values from encrypted big data.

This method may be effectively used to find ranks of data from scores computed through machine learning/deep learning in various applications such as cloud computing applications and machine learning applications. For example, this method may be used to identify a recommended first-rank (tenth-decile) group in a recommendation model, and to identify an upper/lower first-rank/tenth-rank (tenth-decile) group in exploratory data analysis (EDA).

Furthermore, given a real-time service, this method may be used for an operation required for identifying a key value for a query from a homogeneous knowledge database because a top ranker can quickly identified using a specific score as a reference.

In an embodiment, the electronic device 100 may obtain a Kendall's tau statistic using the approximate ranks of the homomorphic ciphertexts. Specifically, for a pair of random observations $(x_i, y_i)$, $(x_j, y_j)$, when $$p_c = Pr((X_i - X_j)(Y_i - Y_j) > 0) \text{ and } p_d = Pr\left((X_i - \xi_j^X)(Y_i - \xi_j^Y) < 0\right),$$

the Kendall's tau statistic is as shown in Formula 24 below.

$$\tau = p_c - p_d \qquad \text{[Formula 24]}$$

When using the approximate ranks described with reference FIG. 3, the electronic device 100 may compute estimations of $P_C$ and $P_D$ as shown in Formula 25 below.

$$\hat{p}_c = Pr\left((X_i - \xi_j^X)(Y_i - \xi_j^Y) > 0\right), \qquad \text{[Formula 25]}$$

$$\hat{p}_d = Pr\left((X_i - \xi_j^X)(Y_i - \xi_j^Y) < 0\right)$$

In an embodiment, the electronic device 100 may obtain a Mann-Whitney U-statistic using the approximate ranks of the homomorphic ciphertexts. When two population groups F={X1,X2, . . . , Xm) and G={Y1,Y2, . . . , Yn} are given, the difference in population mean between the two groups may be denoted by Δ. At this time, an embodiment of the disclosure may also be used in a Mann-Whitney U-statistic for the null hypothesis $H_0$: $\Delta=0$ about a difference in data center location, as shown in Formula 26 below.

$$U = \sum_{i=1}^{m} \sum_{j=1}^{n} I(Y_j > X_i). \qquad \text{[Formula 26]}$$

Specifically, the electronic device 100 may generate one sample including a total of m+n by combining $X_i$ and $Y_j$. In addition, the electronic device may select $$\{\xi_k\}_{k=1}^{K} \text{ knots.}$$

At this time, since $X_i$ and $Y_j$ are independent, the electronic device 100 may obtain an approximate value of U by replacing the argument of the above indicator function with $Y_j > \xi_k > X_i$.

FIG. 7 is a table showing a calculation rate and a mean absolute error depending on the size of homomorphic ciphertexts and the number of knots according to an embodiment of the disclosure.

As shown in FIG. 7, at the time of obtaining approximate ranks of homomorphic ciphertexts using knots, the mean absolute error is equal to or less than 0.0011, which shows that the accuracy is very high. That is, at the time of obtaining approximate ranks of homomorphic ciphertexts using knots, it can be confirmed that the ranks of the homomorphic ciphertexts are almost identical.

In addition, as the number of knots or the number of homomorphic ciphertexts increases, the time required to estimate approximate ranks of the homomorphic ciphertext increases. However, as the number of knots increases, the mean absolute error decreases, confirming that the accuracy increases gradually.

The method according to the disclosure may be effectively used to find ranks of data from scores computed through machine learning/deep learning in various applications such as cloud computing applications and machine learning applications. For example, the method according to the disclosure may be used to identify a recommended first-rank (tenth-decile) group in a recommendation model, and to identify an upper/lower first-rank/tenth-rank (tenth-decile) group in exploratory data analysis (EDA).

Meanwhile, methods according to various embodiments of the disclosure may be included in a computer program product for provision. The computer program product may be traded as a commodity between a seller and a buyer. The computer program product may be distributed in the form of a machine-readable storage medium (e.g., a compact disc read only memory (CD-ROM)), or may be distributed online (e.g., downloaded or uploaded) via an application store (e.g., PlayStore™) or directly between two user devices (e.g., smartphones). If the computer program product is distributed online, at least part of the computer program product (e.g., a downloadable app) may be temporarily generated or at least temporarily stored in a machine-readable storage medium, such as a memory of a server of a manufacturer, a server of an application store, or a relay server.

Methods according to various embodiments of the disclosure may be implemented as software including instructions stored in a machine-readable storage medium (e.g., a computer-readable storage medium). The machine may include electronic devices according to embodiments of the disclosure, which are devices capable of calling the stored instructions from the storage medium and operating according to the called instructions.

Meanwhile, the machine-readable storage medium may be provided in the form of a non-transitory storage medium. Here, the 'non-transitory storage medium' means only that it is a tangible device and does not contain signals (e.g., electromagnetic waves), and this term does not distinguish between a case where data is semi-permanently stored in the storage medium and a case where data is temporarily stored in the storage medium. For example, the 'non-transitory storage medium' may include a buffer in which data is temporarily stored.

When the above-described instruction is executed by the processor, the processor may perform a function corresponding to the command directly or by using other components under the control of the processor. The instruction may contain a code generated or executed by a compiler or an interpreter.

Although the preferred embodiments of the disclosure have been illustrated and described above, the disclosure is not limited to the specific embodiments described above, and various modification may be made by those skilled in the art without departing from the gist of the disclosure as claimed in the appended claims. Such modifications should not be individually understood from the technical spirit or prospect of the disclosure.

The invention claimed is:

1. An electronic device for estimating an approximate rank of a homomorphic ciphertext, the electronic device comprising:

a communication device;

a memory storing at least one instruction; and a processor connected to the memory and configured to control the electronic device, wherein the processor:

obtains N homomorphic ciphertexts;

generates K knots for calculating approximate ranks, K being a number smaller than N;

calculates approximate ranks of the N homomorphic ciphertexts based on probabilities that the N homomorphic ciphertexts exist between the K knots, wherein the processor calculates the approximate ranks of the N homomorphic ciphertexts according to the following formula:

$$r_i' = r'(x_i; \xi) = N \sum_{j=1}^{k} Pr(\xi_{j-1} \le x_i < \xi_j) \cdot I(\xi_j \le x_i)$$

where $x_i$ denotes a homomorphic ciphertext, $r_i'$ denotes an approximate rank of the homomorphic ciphertext, $Pr(\xi_{j-1} \le x_i, \xi_j)$ denotes a probability that $x_i$ exists between $\xi_{j-1}$ and $\xi_j$, and $I(\xi_j \le x_i)$ denotes a function that is 1 when $\xi_j \le x_i$, and 0 otherwise; and identifies a specific decile group or a top-ranked group within a recommendation model or exploratory data analysis using the calculated approximate ranks.

2. The electronic device as claimed in claim 1, wherein the K knots have values between maximum and minimum values of the N homomorphic ciphertexts.

3. The electronic device as claimed in claim 1, wherein intervals between the K knots are equal.

4. The electronic device as claimed in claim 1, wherein the processor:

obtains N first homomorphic ciphertexts and N second homomorphic ciphertexts; and obtains a Spearman rank correlation coefficient of the first homomorphic ciphertexts and the second homomorphic ciphertexts based on approximate ranks of the first homomorphic ciphertexts and the second homomorphic ciphertexts.

5. A control method of an electronic device for estimating an approximate rank of a homomorphic ciphertext, the control method comprising:

obtaining N homomorphic ciphertexts;

generating K knots for calculating approximate ranks, K being a number smaller than N;

calculating approximate ranks of the N homomorphic ciphertexts based on probabilities that the N homomorphic ciphertexts exist between the K knots, wherein the calculating of the approximate ranks of the N homomorphic ciphertexts are calculated according to the following formula:

$$r_i' = r'(x_i; \xi) = N \sum_{j=1}^{k} Pr(\xi_{j-1} \le x_i < \xi_j) \cdot I(\xi_j \le x_i)$$

where $x_i$ denotes a homomorphic ciphertext, $r_i'$ denotes an approximate rank of the homomorphic ciphertext, $Pr(\xi_{j-1} \le x_i < \xi_j)$ denotes a probability that $x_i$ exists between $\xi_{j-1}$ and $\xi_j$, and $I(\xi_j \le x_i)$ denotes a function that is 1 when $\xi_j \le x_i$, and 0 otherwise; and identifying a specific decile group or a top-ranked group within a recommendation model or exploratory data analysis using the calculated approximate ranks.

6. The control method as claimed in claim 5, wherein the K knots have values between maximum and minimum values of the N homomorphic ciphertexts.

7. The control method as claimed in claim 5, wherein intervals between the K knots are equal.

8. The control method as claimed in claim 5, wherein in the obtaining of the N homomorphic ciphertexts, N first homomorphic ciphertexts and N second homomorphic ciphertexts are obtained, and the control method further comprises: obtaining a Spearman rank correlation coefficient of the first homomorphic ciphertexts and the second homomorphic ciphertexts based on approximate ranks of the first homomorphic ciphertexts and the second homomorphic ciphertexts.

9. An electronic device for estimating an approximate rank of a homomorphic ciphertext, the electronic device comprising:

a communication device;

a memory storing at least one instruction; and a processor connected to the memory and configured to control the electronic device, wherein the processor:

obtains N homomorphic ciphertexts;

generates K knots for calculating approximate ranks, K being a number smaller than N;

calculates approximate ranks of the N homomorphic ciphertexts based on probabilities that the N homomorphic ciphertexts exist between the K knots, wherein the processor calculates the approximate ranks of the N homomorphic ciphertexts according to the following formula:

$$r_i' = r'(x_i; \xi) = N \sum_{j=1}^{k} Pr(\xi_{j-1} \le x_i < \xi_j) \cdot I(\xi_j \le x_i)$$

where $x_i$ denotes a homomorphic ciphertext, $r_i'$ denotes an approximate rank of the homomorphic ciphertext, $Pr(\xi_{j-1} \le x_i < \xi_j)$ denotes a probability that $x_i$ exists between $\xi_{j-1}$ and $\xi_j$, and $I(\xi_j \le x_1)$ denotes a function that is 1 when $\xi_j \le x_i$, and 0 otherwise; and performs a nonparametric statistical operation to obtain a robust statistic from the encrypted data based on the calculated approximate ranks.

10. An electronic device for estimating an approximate rank of a homomorphic ciphertext, the electronic device comprising:

a communication device;

a memory storing at least one instruction; and a processor connected to the memory and configured to control the electronic device, wherein the processor:

obtains N homomorphic ciphertexts;

generates K knots for calculating approximate ranks, K being a number smaller than N;

calculates approximate ranks of the N homomorphic ciphertexts based on probabilities that the N homomorphic ciphertexts exist between the K knots, wherein the processor calculates the approximate ranks of the N homomorphic ciphertexts according to the following formula:

$$r_i' = r'(x_i; \xi) = N \sum_{j=1}^{k} Pr(\xi_{j-1} \le x_i < \xi_j) \cdot I(\xi_j \le x_i)$$

where $x_i$ denotes a homomorphic ciphertext, $r_i'$ denotes an approximate rank of the homomorphic ciphertext, $Pr(\xi_{j-1} \le x_i < \xi_j)$ denotes a probability that $x_i$ exists between $\xi_{j-1}$ and $\xi_j$, and $I(\xi_j \le x_i)$ denotes a function that is 1 when $\xi_j \le x_i$, and 0 otherwise; and identifies a key value for a query from a homogeneous knowledge database by identifying a top-ranking ciphertext among the calculated approximate ranks.

* * * * *